(No Model.)
E. THOMSON.
FRICTION COUPLING FOR DYNAMOS OR MOTORS.
No. 496,710. Patented May 2, 1893.
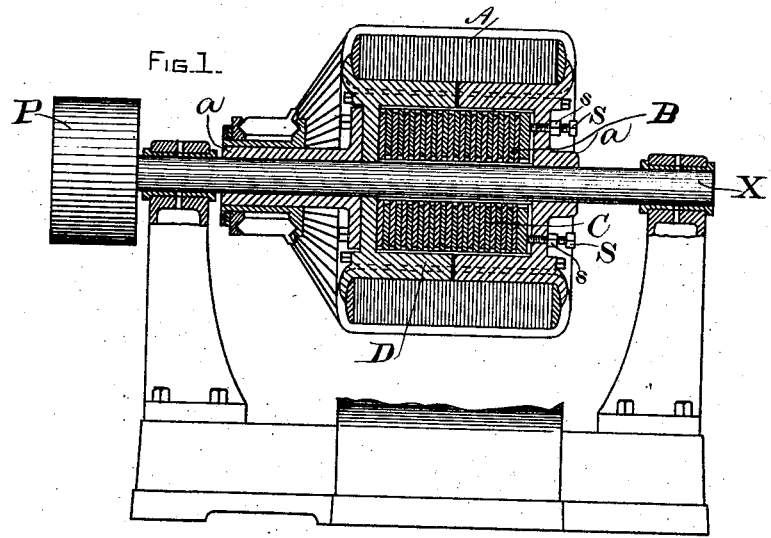
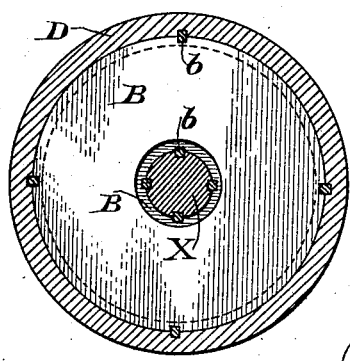
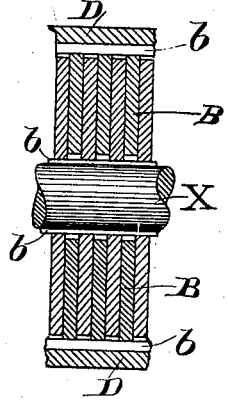
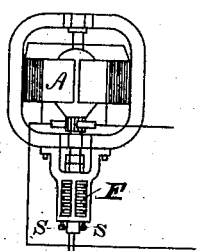
Witnesses.
A. F. Macdonald
A. W. True
Inventor.
Elihu Thomson
by Bentley & Blodgett
Attys.

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

FRICTION-COUPLING FOR DYNAMOS OR MOTORS.

SPECIFICATION forming part of Letters Patent No. 496,710, dated May 2, 1893.

Application filed December 10, 1891. Serial No. 414,561. (No model.)

*To all whom it may concern:*

Be it known that I, ELIHU THOMSON, a citizen of the United States, residing at Swampscott, in the county of Essex and State of Massachusetts, have invented certain new and useful Improvements in Friction-Couplings for Dynamos and Motors, of which the following is a specification.

This invention relates to a friction coupling for dynamos and motors, and its object is to prevent overstrain of the driving or driven parts, the coupling normally effecting a connection between such parts, and maintaining such connection with little or no slip, as long as a certain predetermined torque is not exceeded, but yielding or slipping when such torque is exceeded, so as to prevent injury to the parts.

I am aware that frictional connections, subject to accidental slippage, have been employed to transmit power to or from dynamos or motors, but the slippage which sometimes occurs in such cases is accidental and unreliable, no means having been provided for insuring and limiting its action in a definite and permanent manner. I am also aware that it has been proposed to connect the armatures of dynamos to their shafts by a friction coupling wherein the amount of friction is dependent on and increases with the torque, the frictional connection being released when the torque ceases, and being indefinitely increased as the torque increases, so that there is no definite or predetermined limit beyond which the coupling will be sure to slip. It has also been proposed to make the driving connection in the form of a spring coupling wherein the spring is carried by the driving part and bears frictionally against the driven part, but this does not give the requisite positive connection, and the slipping limit is uncertain, and cannot be predetermined, both on account of the yielding nature of the device, and the lack of a definite adjusting device for the frictional connection. In one of such proposed devices, the frictional contact surfaces are made irregular, with an adjustable projecting part, which gives an intermittent and uncertain connection, and is incapable of accurate adjustment.

My invention consists in a friction coupling having its frictional contact adjustable by a set or permanent adjustment, which having been once set, gives a positive and reliable connection between the driving and driven members until a certain torque is exceeded, and then acts certainly and reliably to allow relative slippage. In order to make the action of the coupling, both in connection, and in slipping, certain and steady, I make the frictional contact surfaces even or uniform in the direction of movement, so that the slip in the transmitted torque does not vary during the motion of the parts, but is subject only to the permanent adjustment of the setting device.

My invention meets the case of an electric motor running for driving machinery and suddenly, for some cause, an enormous resistance to rotation coming upon the machinery, as from breakage or otherwise, the motor may still turn after a predetermined torque has been exceeded and not be brought to an almost instantaneous standstill, such as would rack and strain its parts. In like manner my invention relates to dynamo machines driven by machinery liable to sudden stoppage, or to dynamo machines liable to short-circuit which might throw an undue strain on the driving power. The predetermined slip obtained allows for the rotation of one part irrespective of the other, it only being necessary to set the driving device so as not to slip under normal conditions.

While the purposes of my invention are in an imperfect way secured by belts which may slip under undue strains such actions are by no means constant, nor can they be predetermined irrespective of the conditions of the atmosphere, and other accidental circumstances.

In the accompanying drawings, Figure 1 is an axial section of a dynamo or motor with my improvements applied thereto. Figs. 2 and 3 are details of the frictional devices. Fig. 4 shows a modified arrangement.

The armature A of the dynamo or motor has a hollow body and is mounted on sleeves or hub $d$, so as to be capable of rotation about the shaft X, to or from which the power is transmitted by a pulley P, or other suitable gearing. The armature with its commutator is thus forced to turn independently of the shaft on the sleeves or bearings $a$, except as it is restrained from such independent or relative movement by the friction clutch C, which connects and disconnects the armature and shaft. This friction clutch I have shown as consisting of a number of disks B, all movable longitudinally on the shaft, being keyed by splines $b$, or equivalent devices, alternately to the shaft and to the armature, so that the disks rotating with one of said members, are interposed between the disks rotating with the other member. By forcing these disks together, they are caused to give a frictional connection between the armature and shaft, and the strength or yielding limit of this connection may be varied by adjusting the endwise pressure. For this purpose I provide adjustable clamping devices such as set screws S with lock nuts $s$ for exerting an endwise pressure on the disks.

The described friction clutch is for compactness preferably contained within the armature itself, the part to which alternate ones of the disks are keyed being constituted by a cylindrical spider or shell D.

Any device may be used which causes a determinate and adjustable friction between the sides of the plates where they contact one on another. The disks may engage with, or be "keyed" to the shaft and armature by any connection transmitting rotary motion while allowing endwise movement. The plates may be lubricated to a certain extent with grease or oil and the friction of one on the other is determined by the pressure exerted. This pressure may be made very considerable and will practically hold the parts as one piece until an external strain is brought to bear, when there will be a limit to the power of the plates in resisting the strain, and they will slide by each other. As this action is not required to be continued for any considerable length of time, the apparatus will be very durable.

My invention is applicable among other things to street car motors, the armatures of which are of great weight, and such motors when the car brakes are suddenly put on are of course very quickly brought from a considerable speed to a dead standstill, and at the same time they exert a force which is against the brakes and their retained momentum delays the braking of the car. In like manner an excessive current put through the motor might strain the parts beyond the proper amount either by excessive rush of current when the parts could not move or by mechanical strains of large amount. If in this case however, the armature slips at a predetermined maximum torque no harm will ensue. For electric locomotives of high power, such a feature is of course desirable. It is not necessary that the limited torque device be applied to the inside of the armature or rotative part, but it may be applied outside, as shown in Fig. 4 at F. In this case a motor as at A, is employed for driving a drill at H, it being desirable that in case the drill meets with too much resistance to rotation, the momentum of the armature should not break the drill. Hence the device F provides sufficient rotative power communicated to the drill for the normal work, but allows a slip when the torque or rotative power is above a predetermined maximum amount.

The device F indicated in Fig. 4, is of the same general nature as the friction coupling above described, consisting of two series of plates B, keyed respectively to a part attached to the armature, and to a part attached to the drill, with capability of endwise movement, so as to vary the pressure between them, such pressure being determined by set screws S.

What I claim as new, and desire to secure by Letters Patent, is—

The combination with the shaft of a dynamo electric machine, of an armature having end bearings loosely mounted on said shaft, and a hollow body, two series of annular plates contained within said hollow body and surrounding the shaft, the plates of the two series being placed alternately and loosely keyed respectively to the shaft and the interior of said hollow body, and an adjustable clamping device for forcing said plates together, substantially as described.

In witness whereof I have hereunto set my hand this 4th day of December, 1891.

ELIHU THOMSON.

Witnesses:
JOHN W. GIBBONEY,
BENJAMIN B. HULL.